United States Patent [19]
Oda et al.

[11] Patent Number: 4,843,382
[45] Date of Patent: Jun. 27, 1989

[54] METHOD FOR MONITORING A DIGITAL TRANSMISSION LINE

[75] Inventors: Hidenori Oda; Hiroaki Yano, both of Tokyo, Japan

[73] Assignee: Kokusai Denshin Denwa Co., Ltd., Tokyo, Japan

[21] Appl. No.: 917,638

[22] Filed: Oct. 10, 1986

[30] Foreign Application Priority Data

Oct. 18, 1985 [JP] Japan .................. 60-230929

[51] Int. Cl.[4] .............................. H04Q 9/00
[52] U.S. Cl. .............................. 340/825.060; 455/601
[58] Field of Search ............ 340/825.06, 825.59, 340/825.57, 825.58; 375/3, 3.1, 4, 10, 44, 52, 55, 110; 455/8, 9, 601, 608, 615; 370/13.1; 379/4

[56] References Cited

U.S. PATENT DOCUMENTS

| | | | |
|---|---|---|---|
| 3,909,563 | 9/1975 | Ghosh et al. | 375/3 |
| 4,194,092 | 3/1980 | Luder | 375/10 |
| 4,211,920 | 7/1980 | Wakabayashi | 455/601 |
| 4,270,029 | 5/1981 | Sato et al. | 455/601 |
| 4,319,080 | 3/1982 | Kuwahara | 375/3.1 |
| 4,333,178 | 6/1982 | Farrington | 455/601 |
| 4,363,002 | 12/1982 | Fuller | 375/87 |

Primary Examiner—Donald J. Yusko
Assistant Examiner—Edwin C. Holloway, III
Attorney, Agent, or Firm—Jordan and Hamburg

[57] ABSTRACT

A monitoring control system for a digital transmission line including above one repeater provided between two end stations uses a monitoring control signal of an alternating code with the polarity thereof inverted at a frequency or out-of-serice of a digital transmission line. The alternating code is transmitted, with the polarity thereof inverted at a frequency determined by monitoring control information, from an information transmission side between the repeater and one of the end stations for the transfer of control information. On an information reception side therebetween an exclusive OR of a received signal and an alternating code obtained through frequency division of a clock signal extracted from the received signal is obtained. The frequency component is reproduced from the exclusive OR. And the monitoring control information transmitted from the information transmission side is identified in a step of generation of the reproduced frequency component.

4 Claims, 7 Drawing Sheets

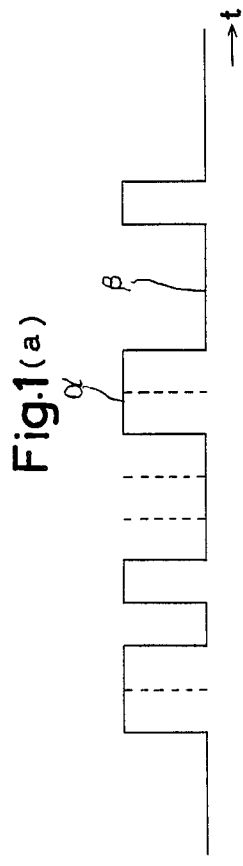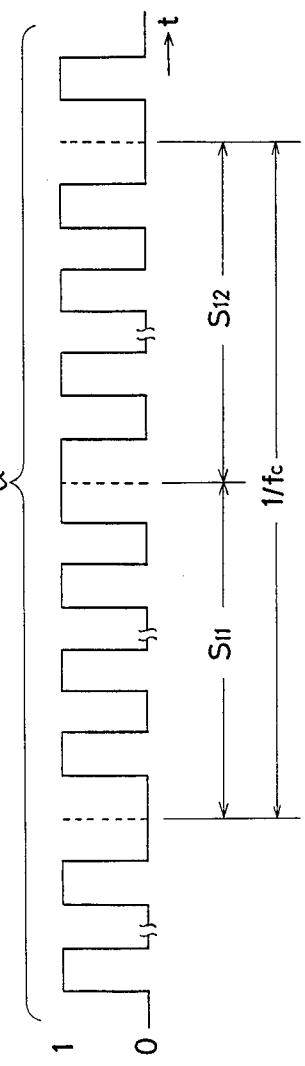

METHOD FOR MONITORING A DIGITAL TRANSMISSION LINE

FIELD OF THE INVENTION

This invention relates to a monitoring control system for a digital transmission line for effecting monitoring control of a digital transmission line including a repeater in an out-of-service state.

DESCRIPTION OF THE PRIOR ART

In a digital transmission line including a repeater, it is important to be able to monitor the line from an end station under remote control in order to determine the operating status of the repeater and determine a point of trouble in case of occurrence of such trouble.

A monitoring control system, maybe an in-service system, in which the monitoring is performed while continuing service, or an out-of-service system, in which the service is temporarily interrupted for monitoring. The present invention concerns the out-of-service system.

FIG. 4 is a schematic view showing a prior art monitoring control system in an optical digital transmission line. The optical digital transmission line consists of a pair of end stations 1, a pair of optical cables 3 as up- and down-transmission lines and one or more optical repeaters 2 having reproduction repeater circuits 4 reproducing and amplifying optical signals from optical fiber cables. Each optical repeater 2 can set a loop 5 for returning a signal from one of the terminal stations to that end station under control therefrom.

Thus, for monitoring the transmission line from the end station 1, a control signal is sent to establish the loop 5 in the optical repeater 2. Subsequently, a monitoring signal is sent to the optical repeater 2, and the returned monitoring signal is analyzed. In this way, the current status of the transmission line can be detected. The control signal in this case, has not only the function of establishing the loop 5, but also has a light source switching function in the case where the reproduction repeater circuit 4 has a spare light source or the like. For this reason, the control signal is encoded to permit identification of the repeater 2 and designation of a control item.

FIG. 5 is a view showing an example of the control signal. This example constitutes a code "110101101" for establishing the loop 5 in the repeater 2. The control signal should not lose its function even in case of trouble due to an erroneous code. Therefore, use is usually made of a mark density modulation process which can withstand erroneous codes. In a portion of signal S1 corresponding to "1" in FIG. 5(a), a psuedo-random signal S2 with a mark density of $\frac{1}{4}$ and a psuedo-random signal S3 with a mark density $\frac{3}{4}$ are repeated at a modulation frequency fc as shown in FIG. 5(b).

A portion of signal S4 corresponding to "0" in FIG. 5(a) is a psuedo-random signal with a mark density of $\frac{1}{2}$.

FIG. 6 shows an example of a control system which uses this control signal. The function of the control signal will be described in further detail.

The control signal is produced as follows. The output of a generator 6, which is provided in an end station T1 for generating an electric psuedo-random signal S2 with mark density of $\frac{1}{4}$, is inverted in a sign inverter 9 according to the output of a modulation generator 8, which generates a frequency fc designated by an encoder 7 for generating a control code, thus obtaining an electric mark density modulation electric signal S1 as shown in FIG. 5(a). This signal S1 and the output of a generator 10, which generates an electric psuedo-random signal S4 with a mark density of $\frac{1}{2}$, are switched by a switch 11 according to a code designated by the encoder 7, whereby an electric control signal S5 is obtained. The electric control signal S5 is fed to a laser diode 12, which in turn produces an optical signal L1 which is transmitted through an optical fiber cable 13 to a repeater T2. In the repeater T2, the optical signal L1 is converted by a light-receiving element (avalanche photo diode) 14 into an electric signal S6, which is reproduced in a reproduction repeater 15. The reproduced data signal S7 thus obtained is added to a bandpass filter 16. The filter 16 extracts the mark density modulation frequency fc. The output of the filter 16 is detected by a detector 17 and decoded in a decoder 18 to recover the transmitted control code. This control code represents a corresponding control item as noted above. Thus, a control circuit 19 identifies this control item and controls an object of control. In the Figure, reference numeral 20 designates a laser diode, and reference numeral 21 designates an optical fiber cable.

Now, an optical digital transmission line monitoring system employing the above control system will be described with reference to FIG. 7. FIG. 7 shows an example of the system for monitoring a bias voltage applied to the light-receiving element APD 14. A return loop 22 has been established by the action of the control system described above. Also, in the illustrated state of being received control code for monitoring the bias voltage applied to the light-receiving element APD 14 is received. In this state, an electric psuedo-random signal S2 with a mark density of $\frac{1}{4}$ is produced by a psuedo-random signal generator 6 in the end station T1. This signal S2 is led through the return loop 22 between reproduction repeaters 15 and 23 to a sign inverter 24. Meanwhile, the bias voltage applied to the light-receiving element APD 14 is converted by a voltage-to-frequency (V/f) converter 25 to a frequency fm corresponding to a voltage. The sign inverter 24 inverts the sign of an input electric psuedo-random signal S8 with mark density of $\frac{1}{4}$ at the frequency fm, thus providing a mark density modulation.

The resultant electric signal S9 is once converted by a laser diode 26 into an optical signal L2, which is returned through an optical fiber cable 21 to the end station T1. In the end station T1, the optical signal L2 is converted by a light-receiving element APD 27 into an electric signal S10. The signal S10 is amplified by an amplifier 28 to be fed to a low-pass filter 29 to extract the frequency fm. A frequency counter 30 detects this value, whereby the bias voltage applied to the light-receiving element APD 14 in the optical repeater T2 can be determined. In the figure, reference numeral 57 designates a light-receiving element.

In the foregoing, a monitoring control system adopting the employing mark density modulation has been described. Generally, the system is designed with the presumption that the mark density of codes transmitted to a digital transmission line is statistically $\frac{1}{2}$. From this standpoint, in the prior art technique described above it is necessary to transmit for long time a signal ($\frac{1}{4}$ in the above example) which deviates somewhat from the mark density of $\frac{1}{2}$ as a monitoring signal. Therefore, a DC component is generated in the signal. For this reason, each repeater should be capable of transmitting a signal inclusive of a DC component. This means that the construction of the reproduction repeater is complicated. In addition, it is impossible to monitor the repeater with mark density of ½ corresponding to the normal state of the transmission line.

SUMMARY OF THE INVENTION

The present invention overcomes the drawbacks noted above in the prior art, and it seeks to provide a digital transmission line monitoring control system capable of transmission line monitoring control without use of mark density modulation and with the mark density held at ½ at all times.

A feature of the invention is that use is made as a monitoring control signal of an alternating code with the polarity thereof inverted at a certain frequency for out-of-service monitoring of a digital transmission line. More specifically, according to the invention there is provided a monitoring control system for a digital transmission line including a repeater provided between two end stations, wherein an alternating code is transmitted, with the polarity thereof inverted at a frequency determined by monitoring control information, from said repeater or one of said end stations for transmission of information for the transfer of control information from repeater station to said end stations or from said end stations to said repeater station, on the information reception side an exclusive OR of said received signal and an alternating code obtained through frequency division of a clock signal extracted from said received signal is obtained, said frequency component is reproduced from said exclusive OR, and monitoring control information transmitted from said information transmission side is identified in a step of generation of the reproduced frequency component.

BRIEF DESCRIPTION OF THE DRAWINGS

FIG. 1 is a view showing a control signal according to the invention, with a baseband pattern modulation signal shown in FIG. 1(a) and a polarity inversion modulation signal shown in FIG. 1(b);

DESCRIPTION OF THE PREFERRED EMBODIMENT

Now, an embodiment of the invention will be described with reference to FIGS. 1 to 3 in connection to a case where the invention is applied to an optical digital transmission line of FIG. 4 as described before in connection with the prior art.

FIG. 1 is a view showing a control signal used in the system according to the invention. The baseband pattern of a control signal is modulated as shown in FIG. 1(a). In the "high" portion α of this signal, an alternating code S11 and an inverted modulation signal S12 which is obtained through polarity inversion of the alternating code S11 are repeated at a modulation frequency fc as shown in FIG. 1(b). A "low" portion β of the signal is a continuation of the alternating code S11.

Figure 2:
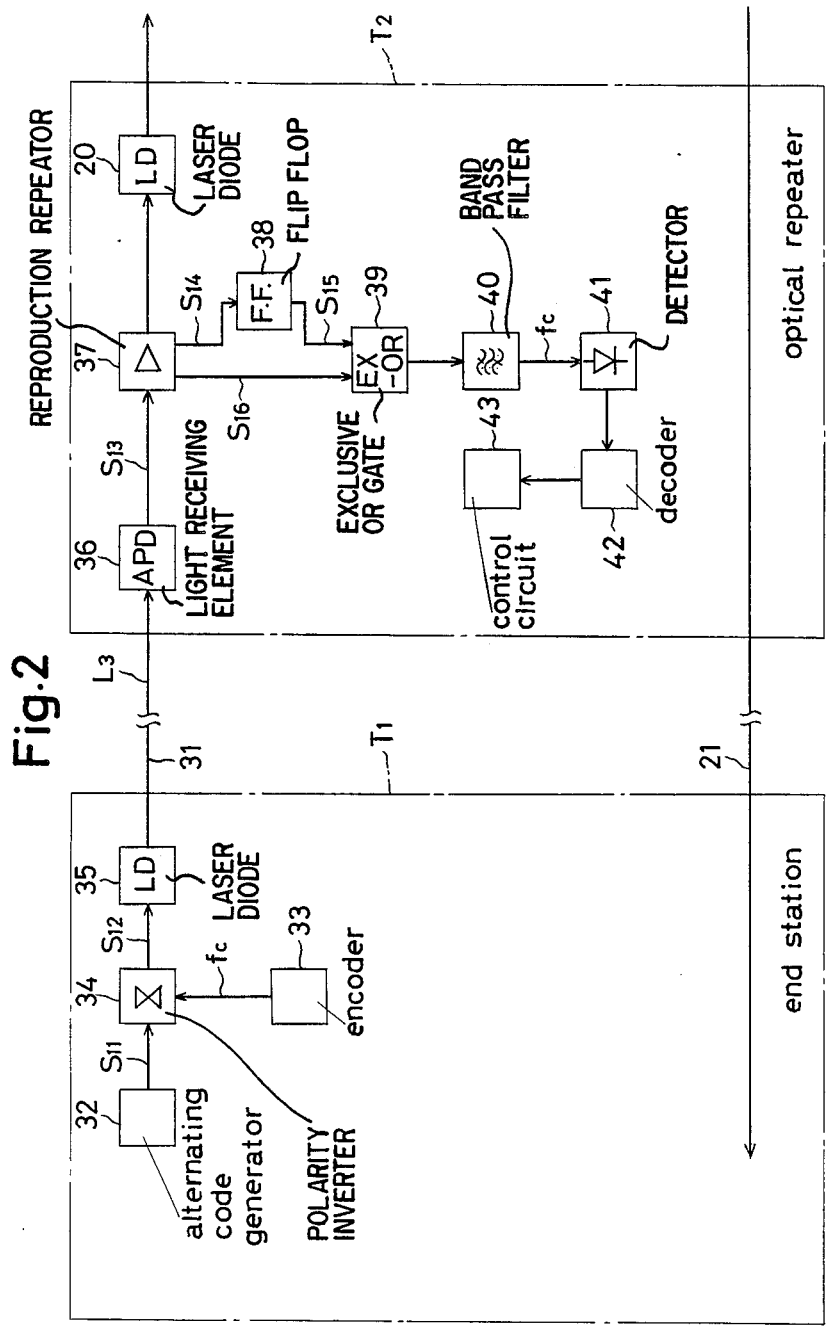
FIGS. 2 and 3 are block diagrams showing a control system and a monitoring system in the system according to the invention.

FIG. 2 is a view showing an example of application of a control system which employs this control signal. An optical repeater T2 is controlled from an end station T1 through a down optical fiber cable 31. As for this control signal, an alternating code S11 obtained from an alternating code generator 32 is subjected to inversion modulation in an encoder 33 and a polarity inverter 34. The resultant inverted modulation signal S12 is fed to a laser diode 35 to obtain an optical signal L3, which is transmitted through an optical fiber cable 31 to an optical repeater T2. In the optical repeater T2, the optical signal L3 is received by a light-receiving element APD 36 for conversion into an electric signal S13. The electric signal S13 is fed to a reproduction repeater 37 to obtain a clock signal S14, which is fed to a flip-flop 38 for frequency division to obtain an alternating code S15. This alternating code S15 is fed along with the reproduced data signal S16 to an exclusive OR gate 39 to obtain a pulse wave having a frequency fc. This pulse wave output is fed to a bandpass filter 40 to extract a frequency component at fc. The output of the band-pass filter 40 is fed through a detector 41 and a decoder 42 to drive a control circuit 43.

Figure 3:
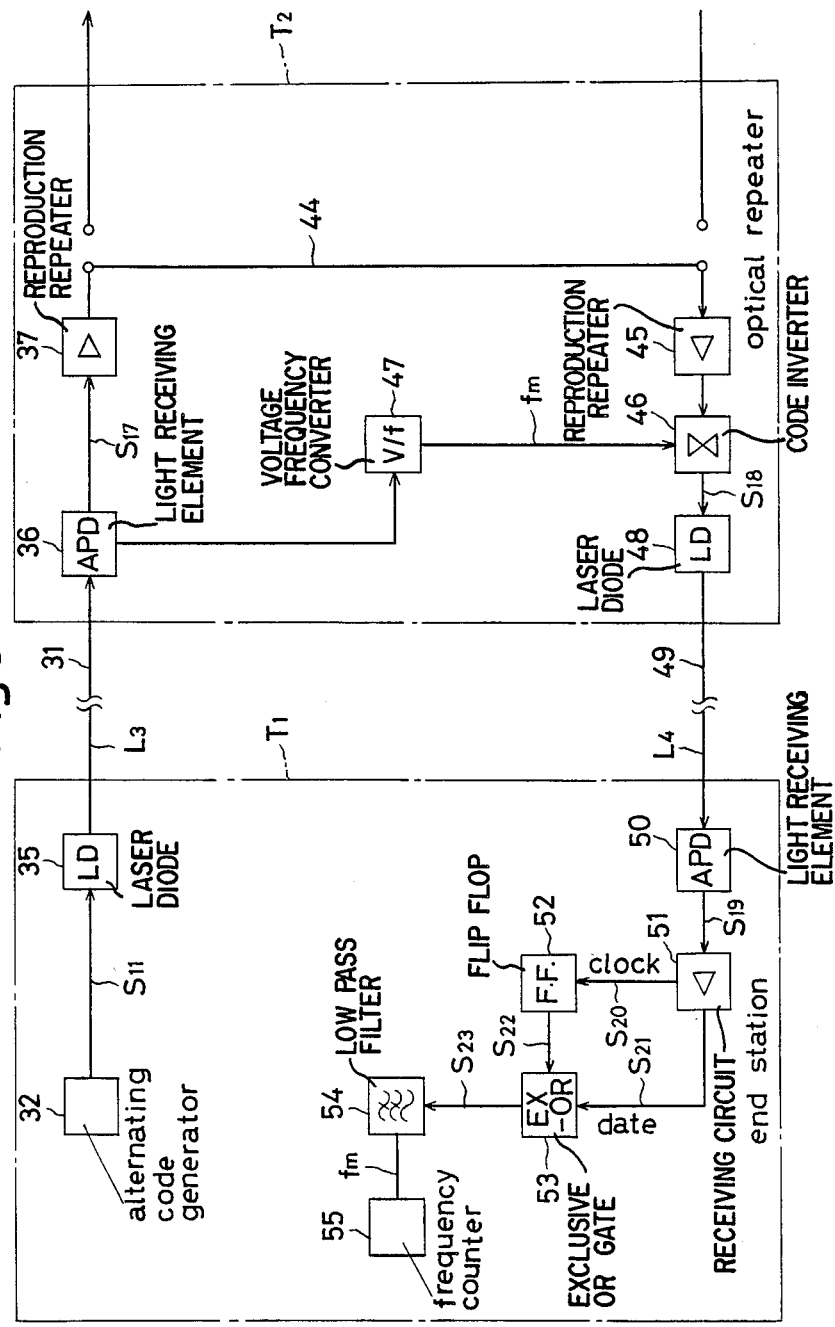
Figure 4:
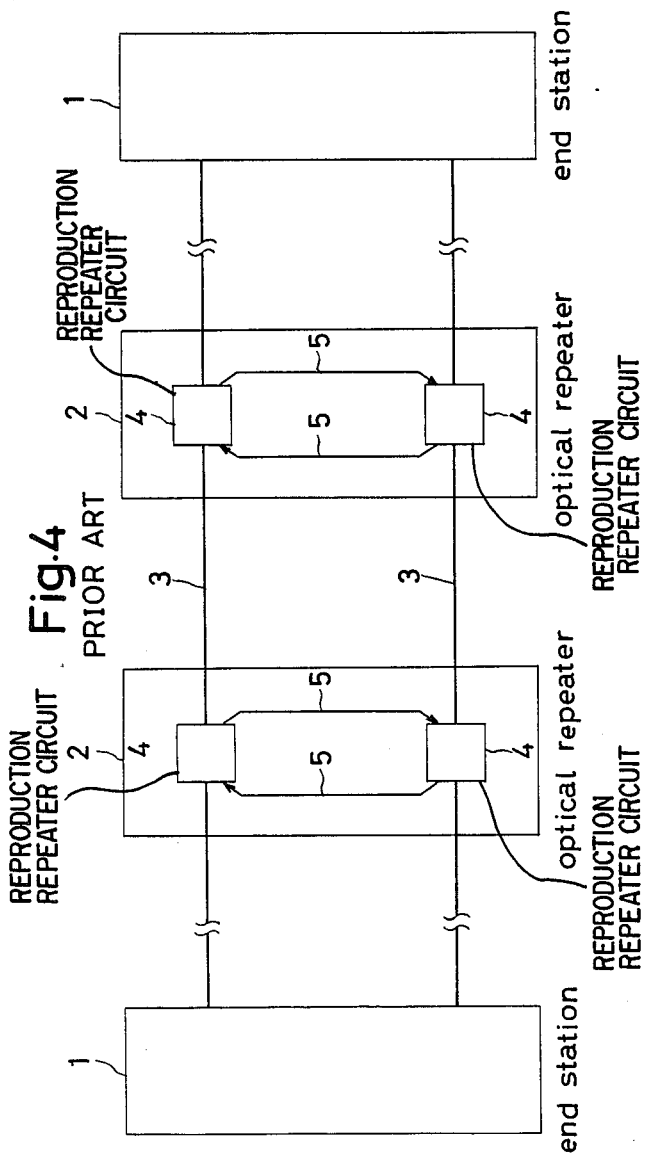
FIG. 4 is a schematic view showing an optical digital transmission line as a typical example of the system capable of adopting the system according to the invention.
Figure 5A:
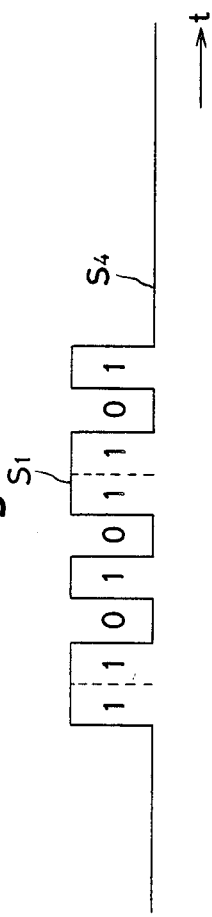
FIG. 5 is a view showing a control signal in a prior art system, with a baseband pattern modulation signal shown in FIG. 5(a) and a mark density modulation signal shown in FIG. 5(b)
Figure 5B:
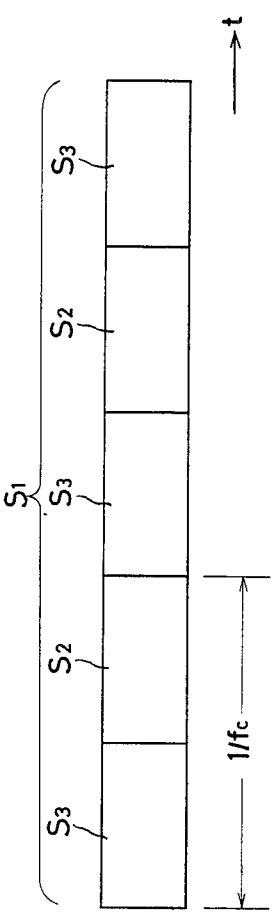
Figure 6:
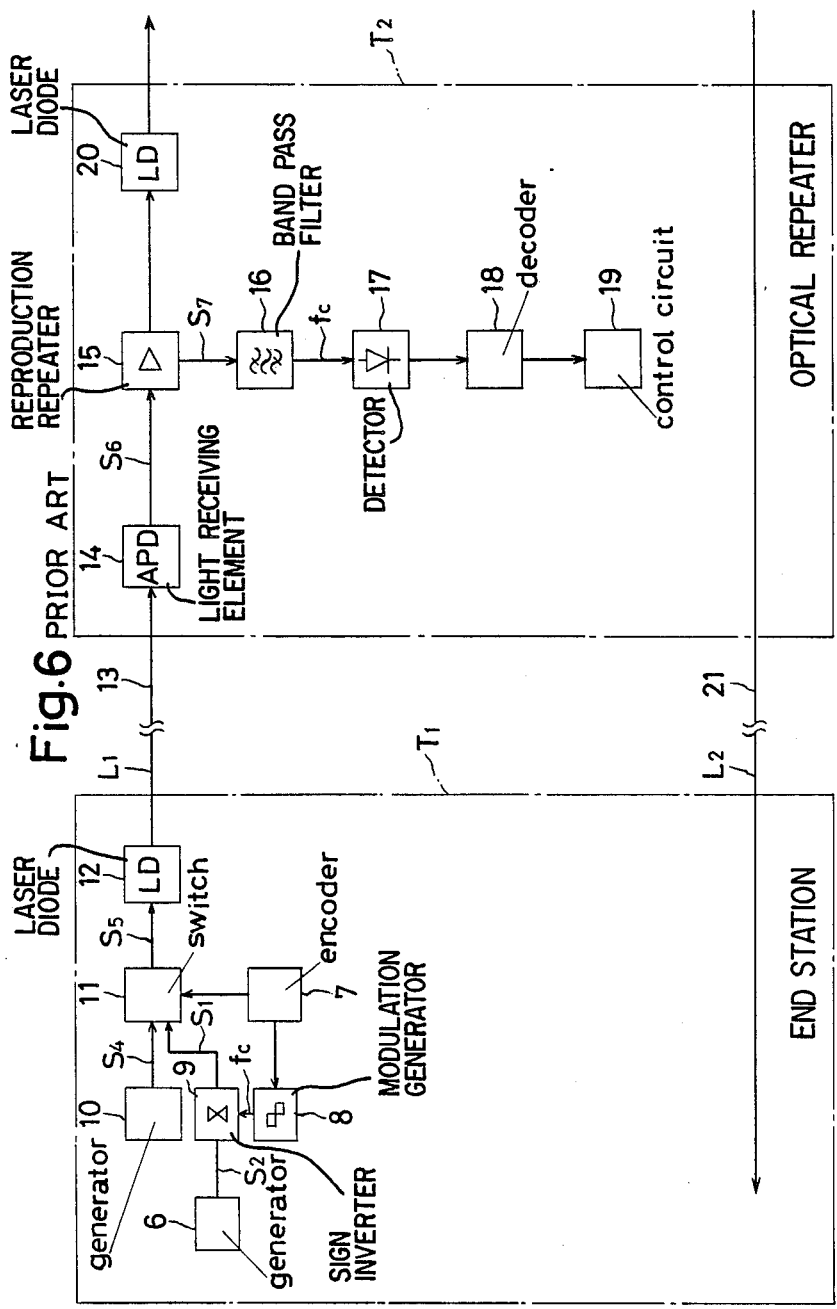
FIGS. 6 and 7 are block diagrams showing a control system and a monitoring system in the prior art system.
Figure 7:
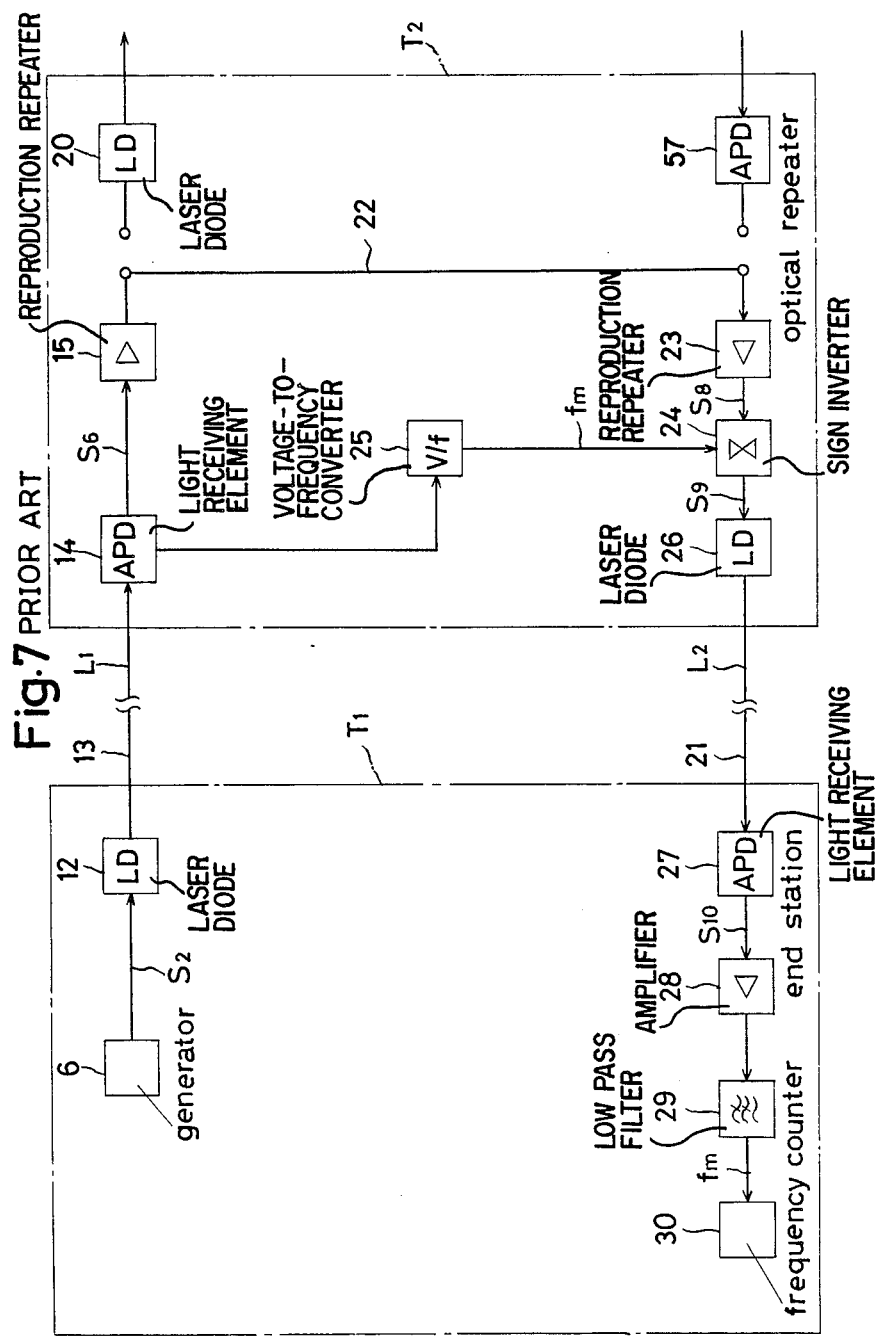

FIG. 3 shows an example of application of the system according to the invention to a monitoring system of the same optical digital transmission line. In this case, a loop 44 has been set in an optical repeater T2 by the control system noted above. Also, in the illustrated state a control command for monitoring the bias voltage applied to a light-receiving element APD36 has been sent. When an optical signal L3 obtained through electric-optical conversion in a laser diode 35 of an alternating code S11 from an alternating code generator 32 in the end station T1 is sent in this state, an alternating code S17 obtained through optical-electric conversion of the optical signal L3 coupled through a down optical fiber cable 31 to a light receiving element APD 36 of the optical repeater T2 is fed from a reproduction repeater 37 through the loop 44 to a reproduction repeater 45 and thence to a code inverter 46 for inversion modulation. The modulation at this time is effected at a frequency fm, which is obtained through voltage-to-frequency conversion of the bias voltage of a light receiving element APD 36 in a voltage/frequency converter 47. The alternating code S18 obtained as a result of modulation is electro-optically converted in a laser diode 48 into an optical signal L4. This optical signal L4 is returned through an up optical fiber cable 49 to the end station T1 for optical-electric conversion in a light receiving element APD 50 into an electric signal S19, which is fed to a receiving circuit 51 for reproduction and amplification. A reproduced clock signal S20 is frequency divided in a flip-flop 52 to obtain an alternating code S22, which is fed along with a reproduced data signal S21 to an exclusive OR gate 53 to obtain a pulse wave signal S23 at a frequency fm. This pulse wave output is fed to a low-pass filter 54 to extract a frequency component at fm. The value of this frequency is read in a frequency counter 55.

In the system according to the invention, as in mark density modulation system, the frequency component is eventually extracted through a filter in the monitoring system and also in the control system. However, in the mark density modulation system the signal for transmission of information contains a noise component such as a psuedo-random signal at all time, whereas in the system according to the invention the signal for transmission of information does not contain any noise component at all, so that it is possible to obtain a reception signal-to-noise ratio higher than that obtainable in the case of the mark density modulation system. Thus, according to the invention, unlike the prior art, use is made at all time of a monitoring control system with a mark density of ½. It is thus possible to simplify the construction of the reproduction repeater circuit in the optical repeater, permit monitoring of a optical repeater at the time of the reception of signal with mark density of ½ and permit improvement of the signal-to-noise ratio at the signal reception terminal compared to a monitoring system or a control system employing the prior art.

What is claimed is:

1. A method for monitoring an optical digital transmission line including a plurality of repeaters disposed at predetermined intervals along a pair of optical fiber cables connected between two end stations, comprising transferring controlling information through said optical digital transmission line from one of said end stations, said controlling information comprising a first signal $\alpha$ repeated at a predetermined period $1/f_c$ for selectively identifying each of said repeaters, said first signal including a first alternating code $S_{11}$ with a mark density of ½ and a second alternating code $S_{12}$ having a polarity inverted with respect to that of said first alternating code $S_{11}$, and a second signal $\beta$ constituting a continuation of said first alternating code;

controlling each said repeater according to said controlling information by detecting and decoding the controlling information received thereby by extracting a frequency $f_c$ with a first exclusive OR gate and a band pass filter coupled thereto in the respective repeater;

returning said first signal $\alpha$ from the respective repeater to said one end station at a repetition frequency $f_m$ that is a function of said respective repeater; and monitoring said repeaters and said optical digital transmission line at said one end station by extracting the frequency $f_m$ from said returned first signal $\alpha$ with a second exlusive OR gate and a low pass filter coupled thereto in said end station.

2. The method for monitoring an optical digital transmission line according to claim 1 comprising obtaining, at said respective repeater, an electric signal by optical-electrical conversion of an optical signal received thereby on one of said optical fiber cables in a light receiving element; applying said electric signal to a reproduction repeater to obtain a clock signal and a reproduced data signal; dividing the frequency of said clock signal in a flip-flop to obtain an alternating code; feeding said alternating code along with said reproduced data signal thence to an exclusive OR gate to obtain a pulse wave having a frequency $f_c$; applying said pulse wave to said band pass filter to extract a frequency component at $f_c$; and applying the output of said band pass filter through a detector and a decoder to control said respective repeater.

3. The method for monitoring an optical digital transmission line according to claim 1, further comprising obtaining, at said respective repeater, an alternating code by optical-electrical conversion of an optical signal received thereby on one of said optical fiber cables in a light receiving element; applying said alternating code via a first reproduction repeater and a loop in said repeater to a second reproduction repeater; obtaining a bias voltage from said light receiving element, generating a signal at a frequency $f_m$ by voltage/frequency conversion of said bias voltage; inversion modulating said alternating code from said second reproduction repeater in a code inverter at said frequency $f_m$; converting an electric alternating code obtained as a result of said modulation into an optical signal in a laser diode; and sending said optical signal through the other optical fiber cable to said one end station.

4. The method for monitoring an optical digital transmission line according to claim 1 comprising obtaining, at said one end station, said first signal by optical-electrical conversion of an optical signal received thereby on one of said optical fiber cables in a light receiving element; applying said obtained first signal to a receiving circuit to reproduce and amplify therein a clock signal and a data signal; dividing the frequency of said clock signal in a flip-flop to obtain an alternating code; feeding said reproduced data signal along with said alternating code to said second exclusive OR gate to obtain therein a pulse wave signal having a frequency $f_m$, feeding said pulse wave signal to the low pass filter for extracting a frequency component at $f_m$; and reading the value of the extracted frequency component in a frequency counter.

* * * * *